(12) United States Patent
Bischoff et al.

(10) Patent No.: US 12,164,285 B2
(45) Date of Patent: Dec. 10, 2024

(54) METHOD FOR MANAGING A PRODUCTION PROCESS

(71) Applicant: Siemens Aktiengesellschaft, Munich (DE)

(72) Inventors: Martin Bischoff, Großhelfendorf (DE); Stefan Dolansky, Altdorf (DE); Hermann Georg Mayer, Prien am Chiemsee (DE); Christian Mose, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 624 days.

(21) Appl. No.: 17/276,602

(22) PCT Filed: Sep. 16, 2019

(86) PCT No.: PCT/EP2019/074611
§ 371 (c)(1),
(2) Date: Mar. 16, 2021

(87) PCT Pub. No.: WO2020/058151
PCT Pub. Date: Mar. 26, 2020

(65) Prior Publication Data
US 2022/0043434 A1 Feb. 10, 2022

(30) Foreign Application Priority Data
Sep. 17, 2018 (EP) ..................... 18194820

(51) Int. Cl.
G05B 19/418 (2006.01)
G06F 21/10 (2013.01)
(Continued)

(52) U.S. Cl.
CPC ... *G05B 19/41865* (2013.01); *G05B 19/4183* (2013.01); *G06F 21/10* (2013.01); *H04L 9/0819* (2013.01); *H04L 9/50* (2022.05)

(58) Field of Classification Search
CPC ...... B33Y 50/00; G05B 19/042; G05B 19/19; G05B 19/402; G05B 19/409;
(Continued)

(56) References Cited

U.S. PATENT DOCUMENTS

| 7,314,169 B1 | 1/2008 | Jasper | 235/382 |
| 8,572,757 B1 * | 10/2013 | Stamos | H04L 63/0428 380/278 |

(Continued)

FOREIGN PATENT DOCUMENTS

| CN | 1444742 A | 9/2003 | G06F 21/56 |
| CN | 1759363 A | 4/2006 | G06F 1/00 |

(Continued)

OTHER PUBLICATIONS

Search Report and Written Opinion for International Application No. PCT/EP2019/073171, 12 pages, Oct. 21, 2019.
(Continued)

*Primary Examiner* — Santosh R Poudel
(74) *Attorney, Agent, or Firm* — Slayden Grubert Beard PLLC

(57) ABSTRACT

Various embodiments include a method for managing a production process for fabricating a component comprising: storing fabrication data for fabricating the component in a first file container; storing reproduction data relating to the component in the first file container, wherein said reproduction data includes a permission relating to the fabrication of the component; storing production data indicating a state of a production machine during the production process in a second file container; storing character data indicating a
(Continued)

property of the component in a third file container; receiving a request; and providing at least one datum in response to the request, the at least one datum selected from the group of data consisting of: the stored fabrication data, the reproduction data, the production data, and/or the character data.

15 Claims, 1 Drawing Sheet

(51) Int. Cl.
*H04L 9/08* (2006.01)
*H04L 9/00* (2022.01)

(58) Field of Classification Search
CPC ...... G05B 19/4148; G05B 2219/36542; G06F 16/51; G06F 3/1203; G06F 3/1222; G06F 3/1226; G06F 3/1232; G06F 3/1238; G06F 3/1239; G06F 3/1255; G06F 3/126; G06F 3/1271; G06F 3/1285; G06F 3/1288
See application file for complete search history.

(56) References Cited

U.S. PATENT DOCUMENTS

| | | | | |
|---|---|---|---|---|
| 11,134,067 | B1 * | 9/2021 | Aung | H04L 63/20 |
| 2004/0196972 | A1 * | 10/2004 | Zhu | H04N 19/68 |
| | | | | 348/E7.056 |
| 2005/0004873 | A1 | 1/2005 | Pou et al. | 705/51 |
| 2009/0164039 | A1 | 6/2009 | Jung | G06F 19/00 |
| 2015/0086014 | A1 * | 3/2015 | Adkins | H04L 1/4486 |
| | | | | 380/243 |
| 2015/0134955 | A1 | 5/2015 | Lacaze | H04L 9/32 |
| 2015/0205544 | A1 * | 7/2015 | Webb | G06F 3/1285 |
| | | | | 358/1.15 |
| 2016/0162693 | A1 | 6/2016 | Breuer et al. | 713/164 |
| 2016/0257074 | A1 * | 9/2016 | Levine | G05B 15/02 |
| 2016/0259306 | A1 * | 9/2016 | Pangrazio, III | H04L 9/3247 |
| 2017/0279783 | A1 | 9/2017 | Milazzo | H04L 29/06 |
| 2018/0012311 | A1 * | 1/2018 | Small | B22F 10/39 |
| 2019/0087598 | A1 * | 3/2019 | Adkins | H04L 9/0643 |
| 2020/0186354 | A1 * | 6/2020 | Balinsky | G06K 15/4095 |

FOREIGN PATENT DOCUMENTS

| | | | | |
|---|---|---|---|---|
| CN | 107003815 A | | 8/2017 | G06F 3/06 |
| EP | 3159824 A1 * | | 4/2017 | G06F 21/10 |
| EP | 3 226 165 | | 10/2017 | G06F 21/10 |
| WO | 01/92981 A2 | | 12/2001 | G06F 21/56 |

OTHER PUBLICATIONS

Search Report for EP Patent Application No. 18194820.9, 8 pages, Feb. 19, 2020.
Chinese Office Action, Application No. 201980060207.9, 21 pages, Nov. 28, 2023.

* cited by examiner

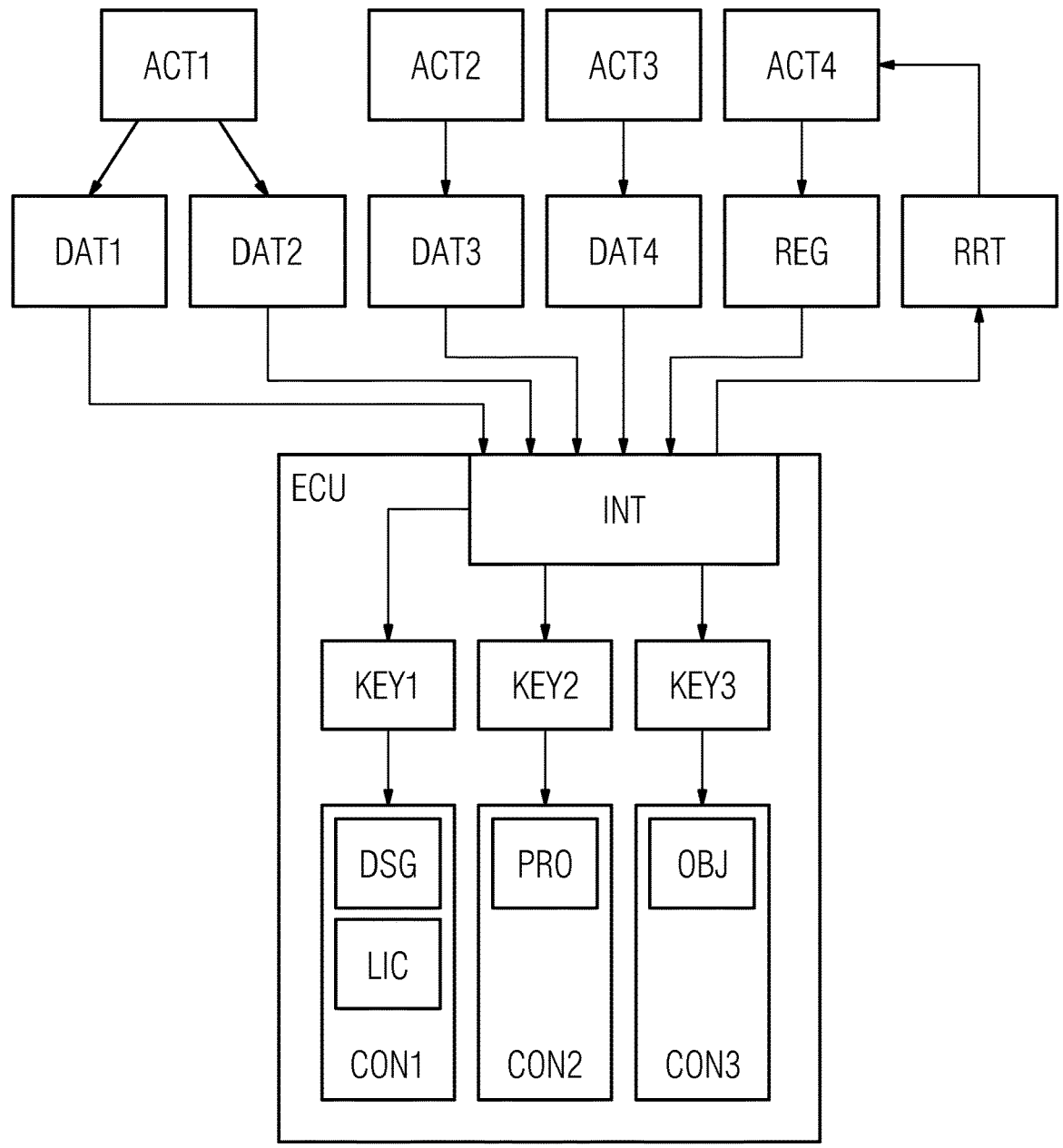

METHOD FOR MANAGING A PRODUCTION PROCESS

CROSS-REFERENCE TO RELATED APPLICATIONS

This application is a U.S. National Stage Application of International Application No. PCT/EP2019/074611 filed Sep. 16, 2019, which designates the United States of America, and claims priority to EP Application No. 18194820.9 filed Sep. 17, 2018, the contents of which are hereby incorporated by reference in their entirety.

TECHNICAL FIELD

The present disclosure relates to production processes. Various embodiments include methods for managing a production process for fabricating at least one component, computer programs which can be loaded directly into a memory of an electronic computing unit for carrying out the steps of the method for managing the production process, and/or electronically readable data carriers storing electronically readable control information.

BACKGROUND

Modern manufacturing processes or production processes are largely automated and digitized. They consist of a sequence or series of manufacturing steps or production steps. The respective production step in this case is usually performed using production machines which are specialized but can nonetheless be deployed generically. This means that the respective production machine is effectively so designed as to be suitable for the fabrication of a wide variety of different components, without requiring the use of tools that are specifically tailored to one component, for example. Additive or subtractive manufacturing methods or manufacturing processes such as e.g. 3D printing, milling, stamping, or grinding are suitable for this purpose. Such a production machine is therefore suitable for unlimited replication of any component. This is not always desirable, since e.g. component quality is then difficult for e.g. an end user of the component to verify due to indiscriminate unauthorized replication.

It can be very challenging, particularly as a result of digitization, for a developer or designer of a product or component to protect the fabrication instructions of the product or component against unlimited replication while at the same time allowing a simple transfer of the fabrication instructions e.g. to a component fabricator. In contrast with the aforementioned product designer, a production machine fabricator whose production machine is suitable for creating the component would like as much data as possible e.g. concerning the deployment and utilization of their production machine in order to allow improvements to be made.

On the other hand, it is challenging for the component fabricator to establish stable and sustainable production monitoring, checking, management and/or control in relation to the production machines or fabrication processes they use in the production of the component. It might be important for the end user of the produced component to be able to confirm the originality of the component in order to validate warranty and/or guarantee claims, for example. Furthermore, the originality also allows a quality of the component to be assessed. It is clear that a complete production process, i.e. from the product design to the finished product or component, is hard to understand and even harder to monitor and manage.

SUMMARY

The teachings of the present disclosure include methods, computer programs, and electronically readable data carriers, by means of which management of a production process for fabricating at least one component can be performed. For example, some embodiments of the teachings herein include a method for managing a production process for fabricating at least one component, comprising the steps: storing fabrication data (DSG) on the basis of which the component can be fabricated by the production process, in a first file container (CON1) (STP1); storing reproduction data (LIC) which relates to the component, wherein said reproduction data (LIC) characterizes at least one permission relating to the fabrication of the component, in the first file container (CON1) (STP2); storing production data (PRO) which characterizes at least one state of at least one production machine during the production process, in a second file container (CON2) (STP3); storing character data (OBJ) which characterizes at least one property of the component that is fabricated by the production process, in a third file container (CON3) (STP4); receiving at least one request (REQ) (STP5); and providing at least one part (PRT) of the stored fabrication data (DSG) and/or reproduction data (LIC) and/or production data (PRO) and/or character data (OBJ) as a function of the request (REQ) (STP6).

In some embodiments, the fabrication data (DSG) is stored in an encrypted manner using at least one first key (KEY1) and/or the production data (PRO) is stored in an encrypted manner using at least one second key (KEY2) and/or the character data (OBJ) is stored in an encrypted manner using at least one third key (KEY3).

In some embodiments, it is verified whether the request (REQ) is authorized to effect the provision of at least the part (PRT).

In some embodiments, the first file container (CON1) and the second file container (CON2) or the second file container (CON2) and the third file container (CON3) or the third file container (CON3) and the first file container (CON1) or the first file container (CON1) and the second file container (CON2) and the third file container (CON3) take the form of a shared file container.

In some embodiments, a checksum of the fabrication data (DSG) and/or a checksum of the production data (PRO) and/or a checksum of the character data (OBJ) is stored in the respectively associated file container (CON1-CON3).

In some embodiments, a checksum of the fabrication data (DSG) and/or a checksum of the production data (PRO) and/or a checksum of the character data (OBJ) is stored in a separate further file container.

In some embodiments, the respective file container (CON1-CON3) is stored in a respective database or the file containers (CON1-CON3) are stored in the same database.

In some embodiments, at least one of the databases is operated as a distributed ledger.

In some embodiments, the fabrication data (DSG) is assigned a level of detail that can be predefined and characterizes an accuracy with which the fabrication data (DSG) must be provided.

In some embodiments, the fabrication data (DSG) is provided on the basis of the level of detail as a function of the request (REQ).

In some embodiments, the production data (PRO) comprises configuration data and/or maintenance measures and/ or production processes that have been performed and/or warning/error reports relating to the production machine.

In some embodiments, the production data (PRO) comprises time and/or duration of at least one production step of the production process.

In some embodiments, the character data (OBJ) comprises at least one production step of the production process and/or fabricator details and/or a date of the production step and/or a location of the production step.

In some embodiments, the component is assigned a hardware token which can be identified with reference to the reproduction data (LIC).

In some embodiments, at least one part of the component is manufactured by means of additive and/or subtractive manufacturing.

As another example, some embodiments include a computer program which can be loaded directly into a memory of an electronic computing unit (ECU), with program means for executing the steps of the method as described herein when the program is executed in the computing unit (ECU).

As another example, some embodiments include an electronically readable data carrier having electronically readable control information which is stored thereon and comprises at least one computer program as described herein and is so configured as to perform a method as described herein when the data carrier is used in an electronic computing unit (ECU).

BRIEF DESCRIPTION OF THE DRAWINGS

Further advantages, features, and details of the teachings herein can be derived from the following description of an exemplary embodiment and with reference to the drawings. The features and combinations of features cited in the foregoing description and the features and combinations of features cited below in the description of the figures and/or shown in the figures alone can be used not only in the combination specified in each case, but also in other combinations or singly without departing from the scope of the disclosure.

FIG. 1 shows a method for managing a production process for fabricating at least one component incorporating teachings of the present disclosure in a sequence diagram; and FIG. 2 shows a block diagram of an electronic computing unit for performing the method from FIG. 1.

DETAILED DESCRIPTION

The teachings of the present disclosure may be used to manage a production process for fabricating at least one component, in particular at least partially by at least one production machine. In order that the management of the production process can be performed in a particularly advantageous manner, the example methods described herein comprise a plurality of steps.

In a first step, provision is made for storing, in particular in an encrypted manner, fabrication data on the basis of which the component can be fabricated by the production process, at least one part of a construction instruction, in a first file container. For the purpose of storing or storage, a first electronic computing unit receives the fabrication data and writes it to a storage area, e.g. a storage unit. The fabrication data can be saved in the storage unit by the electronic computing unit, for example. In this case, the computing unit can receive first data, from which the fabrication data can result or be formed. This means that the first data can be the fabrication data or the fabrication data can be created or generated from the first data, which is received in particular. The file container can be interpreted as a virtual file container, for example as a storage area on a storage unit within which the fabrication data can be saved, wherein the fabrication data itself can contain the widest possible range of data or file formats or information, e.g. technical drawings and/or CAD models.

In a second step of the method, provision is made for storing, in particular in an encrypted manner, reproduction data relating to the component, in the first file container, said reproduction data characterizing at least one permission relating to the fabrication of the component. For this purpose, the computing unit can receive second data, from which the reproduction data can result. This means that the second data can be the reproduction data or the reproduction data can be generated or created from the second data. The reproduction data may comprise license conditions or a license which defines what is allowed by the fabrication data or how this can or may be used. The reproduction data can therefore specify by whom, how often, and/or with what precision, and where the component is allowed to be created, by the production machine in particular. Furthermore, the reproduction data can also include a time limitation of the license and/or it can be noted in the reproduction data that a permission for the use of the fabrication data is granted generally or with restrictions.

In a third step of the method, provision is made for storing, in particular in an encrypted manner, production data which characterizes at least one state of the at least one production machine during the production process, in a second file container. The second file container is in some embodiments designed in a similar manner to the first file container and can be stored or saved e.g. on the first storage unit of the electronic computing unit or, possibly additionally, on a further storage unit of a further computing unit. In this case, the computing unit or the further computing unit receives third data, from which the production data can result or be derived or created. This means that, in a similar manner to the first and second data, the third data can be the production data or the production data can be created or generated from the third data. In this case, the production data can include data relating to the deployment and the utilization, problems arising, maintenance measures and operating states of the production machine. The production data can be generated and stored in particular during the operation of the production machine.

In a fourth step of the method, provision is made for storing, in particular in an encrypted manner, character data which characterizes at least one property of the component that is fabricated by the production process, in a third file container. For this purpose, the computing unit or a further computing unit receives fourth data, from which the character data can result or be derived. This means that, in a similar manner to the first data, the fourth data can be the character data or the character data can be created or generated from the fourth data. In this case, the storage can again take place in particular in the storage unit or a further storage unit, which can be assigned in particular to one of the computing units. In particular, the file container can again be structured in a similar manner to the first or second file container. The character data in this case describes characteristic features of the component, e.g. the production process underlying the fabrication of the component and/or typical fabricator details, in particular of a component manufacturer, or similar.

In a fifth step of the example method, a request is received from a user, who can be in particular a product designer, a production machine fabricator, the component manufacturer and/or an applier or end user of the component.

In a sixth step, at least one part of the stored fabrication data and/or reproduction data and/or production data and/or character data is provided, in particular in an encrypted manner, as a function of the request. In this case, the first computing unit is responsible for the management and approval of the requests, e.g. as a control center with which at least one production machine participating in the method is connected or networked, such that the computing unit can manage the licensing of the reproduction data and allow the production machine to fabricate the component.

Using the methods described herein, data is collected or held such that monitoring or management of the production process for the fabrication of the at least one component can be actively effected. All relevant data, in particular the fabrication data, reproduction data, character data, and production data which is required for or occurs during and/or characterizes the production process is saved in the file containers of the method. The respective data, i.e. the fabrication data, reproduction data, production data and character data, is synchronized during the production process, whenever it is modified or when it first occurs, in particular with the respective file container, and can also be continuously updated. The objective and function of the teachings herein include active control, checking or managing the design and production process, i.e. to allow or prohibit specific production steps by means of licenses, to approve designs, to acquire licenses and/or to initiate maintenance and servicing measures.

In some embodiments, the production data is created or provided by the production machine and contains current or past configuration data, maintenance measures, production processes that have been performed, production machine warnings or errors that have occurred, by means of which it is possible to deduce at least one prevailing state of the production machine during the production of the component in particular. The character data characterizes the component in particular and therefore contains a time or duration of the manufacturing steps performed, production machines used or manufacturing licenses used, wherein these can characterize the production process generally or the production process of the respective component in particular, and can moreover contain fabricator information as a data set and the production date or the license.

In some embodiments, only respectively individual aspects of production processes are normally held at present, in particular in non-compatible data management systems. For example, each actor involved in the production process such as the aforementioned product designer, production machine fabricator or component manufacturer and ultimately the end user of the component normally, if at all, uses a separate system to hold the data that is relevant for them. In this case, the respective data of a respective actor often includes data which is confidential and also irrelevant for other actors, and therefore a data management system which is freely accessible to all actors is also not beneficial. This means that management, in particular active management, of the production process is made more difficult or is altogether impossible.

In some embodiments, the fabrication data is linked to or saved together with the reproduction data, wherein the latter can include e.g. a time limitation for the use of the former. Furthermore, a time limitation provides the possibility that the fabrication data can expire, for example. This can therefore be identified easily in the event of further fabrication of the component, and gives the product designer the possibility of updating at least one part of the fabrication data, e.g. design instructions or construction instructions, in particular in order to realize an improvement of the component in a particularly simple manner, such that these modifications can be included in the further production process particularly promptly.

By virtue of the data collected, in particular the production data, it is moreover possible for the production machine fabricator as a result of evaluating the production data to plan maintenance measures for the production machine or to improve the production machine by means of future developments, for example. Therefore, the production data in particular, but also the character data, represent an important basis for maintenance measures and preventive servicing measures, also known as "preventive" or "predictive" maintenance.

Since fabrication data, the reproduction data, the production data, and the character data benefits in each case a group of people or an actor in particular, e.g. the product designer, the production machine fabricator, but also a component manufacturer or the applier, access to said data is desired. However, respective data can contain sensitive or confidential information which is intended for only one of the actors in each case and should remain hidden from the other actors. As a result of using the different file containers, for example, each containing one type of data, e.g. fabrication data, production data and character data, it is possible to implement access management or rights management. The reproduction data assumes a certain special position, since it can govern the cited access or access permission, e.g. in the form of a license that is stored for a respective actor.

In some embodiments, the method for managing a production process is used to manage data which can include designs for component parts, their manufacturing or fabrication processes and their licensing options. Furthermore, the data can be used to record a log book of the production machine, together with its standard operating times and manufacturing processes performed, components and component parts produced and licenses used for this purpose, as well as maintenance and repair measures that have been performed. It is moreover possible as part of said management to record data relating to the produced component such as the underlying manufacturing process, the corresponding fabricator or licensee, and e.g. a production sequence. It is possible in this case for a computing unit, which can be the first and/or a further computing unit in particular, to ensure the avoidance of interface problems and/or synchronization problems between data management systems that are routinely used in the prior art, for example.

In some embodiments, the product designer or product developer may provide or initiate fabrication data for the production process, in particular fabrication instructions for the component and licenses based on the reproduction data. The production machine fabricator maintains log books of their production machine. The manufacturer of the component or component part can acquire the license for the fabrication of the product and perform licensed production processes, whereby licensed component parts can be fabricated, and can also have access to the log books of the production machine. Finally, the end user of the component has the advantage that information about the quality of the component is available by virtue of the data that has been recorded or collected.

In order to protect the data particularly against external or unauthorized accesses, an embodiment variant provides for storing in an encrypted manner respectively the fabrication data using at least one first key and/or the production data using at least one second key and/or the character data using at least one third key. In this case, the respective key is in particular the relevant public key of a "private/public" key pair or is at least created or generated by an asymmetric cryptography method. This has the advantage that since the respective key, i.e. the first key, the second key and/or the third key, each of which is used to encrypt the respective data, can be the "public" key of the key pair in each case, it is possible in a particularly advantageous manner for data to be written into the respective file container in encrypted format during the fabrication process.

In some embodiments, it is verified whether the request is authorized to effect the provision of at least the part of the stored fabrication data and/or the reproduction data and/or the production data and/or the character data, in particular as a function of the request. In this case, the request or also the provision can be realized by sharing the private key of the key pair, said private key being required for decryption of the part. The authorization could also be initiated by the reproduction data or by licenses contained therein. Furthermore, the approval or the authorization could be realized by means of digital rights management (DRM). This means that the respective data, e.g. the fabrication data, production data, and character data, can be protected in a particularly advantageous manner against external and/or unauthorized access, and approved for the correct actor. The method is therefore able in a particularly advantageous manner to provide an access-restricted comprehensive data management system. The access is effected individually, or can be governed individually, by the specific authorization or the request for the data that is to be provided for different parties or actors involved in the fabrication process. The respective actor, who can also encrypt the data individually in each case, is in particular the product designer, the production machine fabricator, the manufacturer of the component part or component, and the user of the component.

In some embodiments, the first file container and the second file container or the second file container and the third file container or the third file container and the first file container or the first file container and the second file container and the third file container take the form of a shared file container. This means in particular that a file container can be provided in which both the fabrication data and the reproduction data, the production data and the character data are saved, whereby in a particularly advantageous manner the entire data of the fabrication process can be saved in a file container. As a result of this, e.g. the request can be processed particularly quickly, in particular by the electronic computing unit.

In some embodiments, a checksum of the fabrication data and/or a checksum of the production data and/or a checksum of the character data is stored in the respectively associated file container. The respective checksum can essentially correspond to a respective so-called hash value in this case. The checksum or the hash value is calculated in each case by a suitable function, in particular a so-called hash function, and characterizes in each case precisely one single state of a respective data set, whereby integrity of the respective data can be verified or ensured in a particularly simple manner.

In some embodiments, a checksum or a hash value of the fabrication data and/or a checksum or a hash value of the production data and/or a checksum or a hash value of the character data is stored in a separate further file container. This means that the respective checksums of the respective data as calculated by e.g. a respective hash function are stored, particularly together, in a file container. As a result of using an additional file container which stores the respective hash values, it is possible to provide a means of verifying the integrity of the fabrication process which is particularly economical of resources because it requires particularly little storage space in a storage device, for example. In this way, the respective checksum can be accessed e.g. particularly quickly e.g. over a data network and then used for an integrity test.

In some embodiments, the respective file container is stored in a respective database or the file containers are stored in the same database. In this case, a database can comprise a storage area of the storage unit of the first electronic computing unit for example, or can be distributed over a plurality of storage areas for example, in particular of a plurality of electronic computing units. Moreover, a plurality of databases can be held or stored on a storage unit of the first computing unit, for example. As a result of the scope for adaptation or flexibility allowing the file containers to be held in one database or respective databases, particularly good access can be achieved e.g. via one of the electronic computing units, so that in particular the respective actor can access the data that is relevant to them particularly quickly, for example.

In some embodiments, at least one of the databases or the possibly sole database is operated as a distributed register. A database that is operated as a distributed register is referred to as a "distributed ledger". If a plurality of electronic computing units are networked together or to each other, i.e. the respective computing unit has in each case at least one interface by means of which it can exchange (or provide and receive) data with at least one of the other computing units, data such as e.g. the fabrication data, reproduction data, production data and character data can, by virtue of the distributed ledger, be kept continuously updated in the database by a plurality of entities, in particular in the correct sequence. In this case, the distributed ledger effectively acts as or generally provides the basis for a block chain, so that the file containers or the database in which the file containers are saved or stored can be operated as a continuously extendable list of data sets which can be concatenated by means of cryptographic methods, e.g. the cited encryption and/or checksum. This means that time-specific integral concatenation can be implemented by a decentralized network of electronic computing units. Using the distributed ledger or the resulting block chain as a method keeping safe or organizing the file containers, the respective actor can be granted access to the data that is intended for them in a simple manner in each case. In a similar manner to the generation of e.g. digital currency units, it is now possible with reference to the block chain to verify rights, in particular to the produced component. This means that e.g. a specific transaction can be generated for each product, so that even in the case of components that are manufactured on a massive scale, e.g. screws, a specific identifier which is created as part of the respective data when this is created can be assigned in a particularly simple and understandable manner to each individual part that is produced.

In some embodiments, the fabrication data is assigned a "level of detail" that can be predefined. This level of detail characterizes an accuracy with which the fabrication data must be provided. This means that different levels of detail may be used for the production or the fabrication process, said levels of detail being described in the fabrication data in each case. For example, in order to present the component for demonstration purposes, the fabrication thereof in reduced resolution or with reduced details is sometimes sufficient, thereby economizing production costs for e.g. a prototype, in particular for demonstration purposes.

In some embodiments, the fabrication data is provided on the basis of the level of detail as a function of the request. In other words, the level of detail shown to the actor who placed the request is dependent on the license or the access limitation that has been saved e.g. in the reproduction data for this actor. If another resolution is used for the fabrication of a component, this can be used as a demonstration object in a similar manner to demo software, so that e.g. an end user at home who specifies e.g. a suitable production machine in the form of a 3D printer as their own is able irrespective of their license to fabricate the part in a simple resolution in order to test it out, for example. If better resolution is required, a corresponding level of detail is approved by a central computing unit or the first computing unit on the basis of the access limitation or the authorization, e.g. for the fabricator of the component. If the component is dependent on a further, differently formed component, whose data is likewise held in the fabrication data but must not however be disclosed, e.g. an interface of the component to the other can be approved in full resolution so that the component for fabrication can be fabricated flawlessly and matches the interface. In this case, the respective production machine is in particular networked with the central computing unit which manages the licensing of the reproduction data.

In some embodiments, the production data comprises in particular configuration data and/or maintenance measures and/or warning/error reports relating to the production machine. The cited data, measures or reports can be used particularly by a fabricator of the production machine in order to improve it.

In some embodiments, the production data comprises time and/or duration of at least one production step of the production process. It is thus possible in a particularly simple manner e.g. to monitor or manage a loading of the production machine or the duration of a production step, and consequently a possible unit volume or a dip in the production quantity or similar during the fabrication of the component.

In some embodiments, the character data comprises at least one production step of the production process and/or fabricator details and/or a date of the production step and/or a location of the production step. This means that even in the case of parts that are manufactured on a massive scale, each produced individual component is assigned a specific identifier by means of which it can be clearly assigned specific production steps at the production site. By virtue of the aforementioned data which can comprise the character data or the aforementioned data which can comprise the production data, it is also possible subsequently to establish a specific sequence between the produced components. This can be useful if defects occur from one component to the next in a specific time period during the production process or within the production, which can be attributed to e.g. impurities of starter material commencing at a time point X. This means that it is particularly easy to confirm or verify the defects.

In some embodiments, the component is assigned a hardware token, which can be designed as a near field communication (NFC) chip or RFID or similar, by means of which the component can be clearly identified with reference to the reproduction data. This means that the produced component can be clearly connected to a transaction in the respective file container or in the block chain. A code can therefore be incorporated into relevant locations, in particular the file container for the reproduction data, which code is then clearly connected to the hardware token. In this way, it is possible to carry a software license over to a hardware license.

In some embodiments, at least one part of the component is manufactured by means of additive and/or subtractive manufacturing, in particular by means of a respective production machine or the at least one production machine. Additive manufacturing in this case is understood to mean 3D printing or laser sintering. Subtractive manufacturing can be understood to mean grinding, milling and/or e.g. turning. This means that both additive and subtractive manufacturing are generative or generic manufacturing methods. The method for managing is particularly suitable for these, since the production machines required for this purpose can manufacture and indefinitely reproduce a great number of the widest variety of components with particular ease. This results in e.g. increased danger of unauthorized component copies, and therefore by means of an authorization, e.g. by means of the reproduction data of the method, or managing the provision of the part of the stored data, this can be avoided with particular ease, whereby e.g. safety or long service life of the component can be guaranteed.

In some embodiments, to a computer program. The computer program can be loaded directly into a memory of an electronic computing unit, and comprises program means for executing the steps of the method when the program is executed in the computing unit.

Some embodiments include an electronically readable data carrier with electronically readable control information, which is stored thereon and comprises at least one inventive computer program as per the preceding aspect and is so configured as to perform the inventive method when the data carrier is used in an electronic computing unit.

In some embodiments, a computer program implements a method described herein on a control unit or computing unit when it is executed on the control unit or computing unit. The computer program here can take the form of a computer program product which can be loaded directly into a memory of a computing unit, with program means for executing a method when the computer program product is executed in the computing unit. The electronically readable data carrier comprises electronically readable control information, which is stored thereon and comprises at least one computer program as described herein and is so configured as to perform a method when the data carrier is used in a computing unit.

Advantages of the methods described herein can be considered as advantages of the computer programs and the electronic data carriers and vice versa.

FIG. 1 shows a sequence diagram of a method for managing a production process for fabricating at least one component. By virtue of the method, a particularly extensive scope of the production process, from product design and then fabrication of the component to guarantee claims made by an end user of the component, can be managed and/or monitored in a particularly advantageous manner, a plurality of steps being provided for this purpose.

In a first step STP1, fabrication data DSG on the basis of which the component can be fabricated by the production process is stored in a first file container CON1.

In a second step STP2, reproduction data LIC relating to the component is stored in the first file container CON1, wherein the reproduction data LIC characterizes at least one permission relating to the fabrication of the component, said permission being a license, e.g. for an actor ACT3 who is a component fabricator or component manufacturer, for fabrication of the component.

In a third step STP3, production data PRO which characterizes at least one state of a production machine during the production process is stored in a second file container CON2. In a fourth step STP4, character data OBJ which characterizes at least one property of the component fabricated by the production process is stored in a third file container CON3. In a further, fifth step STP5, a request REQ is received, said request being received by e.g. the cited actor ACT3 or a further actor ACT1, ACT2, ACT4, who may be a participant in the production process, and in a sixth step STP6, at least one part PRT of the stored fabrication data DSG and/or reproduction data LIC and/or production data PRO and/or character data OBJ is provided as a function of the request REQ.

In some embodiments, the method includes storing in an encrypted manner respectively the fabrication data PRO using at least one first key KEY1, the production data PRO using at least one second key KEY2 and the character data OBJ using at least one third key KEY3, wherein the respective key KEY1-KEY3 can be a key of a "public key" or "public-private" key pair. Alternatively, the fabrication data DSG or production data PRO or character data OBJ can also be stored in an encrypted manner using another encryption method in each case.

Moreover, in order that the method can be performed in a particularly secure manner and that the respective data can be protected against unauthorized access, said data being stored in an encrypted manner in particular, verification of the request REQ takes place on the basis of the key, for example, in order to ascertain whether it is authorized or actually allows the requestor, i.e. one of the actors ACT1-ACT4, to view the requested part of the stored fabrication data DSG and/or reproduction data LIC and/or production data PRO and/or character data OBJ, i.e. it is verified whether the request REQ is authorized to effect the provision of at least the part PRT.

In some embodiments, the respective file container CON1-CON3 can be developed individually or the file containers CON1-CON3 can also be combined to form a shared file container. Either way, the respective file container CON1-CON3 is advantageously stored in a respective database. In some embodiments, if a plurality of file containers CON1-CON3 are present in each case, i.e. the first file container CON1, the second file container CON2 and the third file container CON3, these might not be combined to form a shared file container but still be stored in the same database. This means that the respective file container CON1-CON3 can be saved or stored in many different ways in a storage device, for example, in a plurality of interworking electronic computing units ECU which are organized in a distributed manner in particular. The database can thus be operated advantageously as at least one distributed ledger, meaning that the file containers CON1-CON3 and in particular the respective data contained in the file containers CON1-CON3, i.e. the fabrication data DSG, the reproduction data LIC, the production data PRO and the character data OBJ, can be held as a respective transaction in a so-called block chain.

A block chain is understood to be a database whose integrity is ensured by storing the hash value or a checksum of a preceding data set in a respectively following data set so that integrity can be verified. Therefore, a checksum of the fabrication data DSG and/or a checksum of the production data PRO and/or a checksum of the character data OBJ is advantageously stored in the respectively associated file container CON1-CON3 or in a separate further file container which is designed to store the checksum. A checksum for the reproduction data LIC can likewise be stored.

As cited above, various actors ACT1-ACT4 are involved in the fabrication process, e.g. a product designer and/or a production machine fabricator and/or the component manufacturer and/or an applier of the component in this case.

As a result of the exemplary embodiment of the method or the method illustrated in FIG. 1, at least one advantage is derived for each of the cited actors ACT1-ACT4. The method is therefore designed to enable access-restricted comprehensive monitoring or management, in particular by means of an entity such as an electronic computing unit ECU, of the production process for the fabrication of the at least one component. All of the relevant data in this case, in particular the fabrication data DSG, the reproduction data LIC, the production data PRO and the character data OBJ, is managed by the method and can be provided and/or received by a respective actor ACT1-ACT4 via a corresponding data interface. In particular, the data can be received by the computing unit ECU via the interface INT according to the method and can be encrypted and/or verified by the computing unit ECU. In some embodiments, by virtue of the design as a distributed ledger or block chain, the method provides the means of individually governing an access or a request REQ or retrieval of at least the part PRT for one of the actors ACT1-ACT4.

FIG. 2 shows a block diagram of an electronic computing unit ECU by means of which the method illustrated in FIG. 1 can be performed. The electronic computing unit ECU in this case has at least one interface INT via which data can be received and sent. In addition, e.g. the request REQ can also be received via the interface INT as per STP5 of the method. Furthermore, e.g. first data DAT1 which was introduced by a first actor ACT1 into the production process that is to be monitored or managed by the method can be received via the interface INT. The first data DAT1 received by the computing unit ECU can be data which results in the fabrication data DSG, meaning that the first data DAT1 can be the fabrication data DSG or the fabrication data DSG can be created or generated from said first data DAT1. The first actor ACT1 in this case is in particular e.g. the production designer, who can specify in the fabrication data DSG a type of fabrication instruction whereby the component can be fabricated. Second data DAT2, which can also be received by the computing unit ECU via the interface INT, can be provided in particular by the actor ACT1 or by one of the other actors ACT1-ACT4. The second data DAT2 can be in particular data from which the reproduction data LIC can be created, e.g. the reproduction data LIC itself.

A second actor ACT2 provides data DAT3 for the fabrication process, wherein said data DAT3 can be received by the computing unit ECU via the interface INT. This third data DAT3 can be data which results in the production data PRO, meaning that the third data contains the production data PRO or the production data PRO can be generated or created from the third data DAT3. The procedure is similar for fourth data DAT4, which can be received via the interface INT and is provided in particular by a third actor ACT3, who is in particular the part producer or component manufacturer. In this case, the character data OBJ in particular can be created from the fourth data DAT4 or the fourth data DAT4 already comprises the character data OBJ.

A request REQ can be submitted via the interface INT by a fourth actor ACT4, in particular an end user of the component that has been created. As a result of this, one part of the data PRT can be provided to the actor ACT4, for example.

The data OBJ, PRO, LIC, DSG is saved in a corresponding container CON1-CON3 in each case, wherein DAT1 as fabrication data DSG is encrypted by a key KEY1 and saved in the file container CON1 and the data DAT2 is likewise saved in the file container CON1 as reproduction data LIC. The third data DAT3, in particular as production data PRO which in particular characterizes the state of the production machine during the production process, is saved as production data PRO in the file container CON2 and is encrypted by the key KEY2. The character data OBJ created from the data DAT4 is stored as character data OBJ in the file container CON3 and encrypted by the key KEY3.

In some embodiments, the production data PRO comprises configuration data and/or maintenance measures and/or production processes that have been performed and/or warning reports or error reports of the production machine. Furthermore, the production data can comprise a time and/or duration of at least one of the production steps of the production process.

In some embodiments, the character data OBJ comprises at least one item of production data from the production process and/or fabrication data, i.e. relating to e.g. the actor ACT3 and/or a location of the production step and a date or a time of the production process at which e.g. the component was finally fabricated. The component in this case may be fabricated by means of a generative method such as e.g. additive and/or subtractive manufacturing, such that the production machine is suitable in particular for creating a plurality of components, whereby particularly good management can be achieved by means of the reproduction data LIC in particular.

By virtue of the proposed method and a computer program which can be loaded directly into a memory of the computing unit ECU, it is therefore possible for designs of component parts which are part of the fabrication data DSG to be managed. Furthermore, a log book of the production machine can be included in the production data PRO and e.g. the license that is used can be noted in the character data OBJ in the or for the individual component in each case by way of example. Using the method and by virtue of the log book character of the production data PRO in a particularly advantageous manner, for example, it is therefore possible for repair and maintenance measures to be performed predictively, such that so-called "predictive maintenance" can be performed.

Furthermore, interfaces and synchronization problems between different data management systems are eliminated, since e.g. everything is provided by the file containers CON1-CON3 and the computing unit ECU. By virtue of the encryption models, in particular using the keys KEY1-KEY3, it is possible to govern the individual access of the relevant actors ACT1-ACT4 to the data that is intended for them in each case (DSG, PRO, OBJ). For example, the production designer ACT1 can add or edit fabrication instructions relating to the fabrication data DSG or change the licensing possibilities thereof. The actor ACT3, i.e. the manufacturer of the component part or component, can acquire the licensing in the form of access via the reproduction data LIC, and e.g. perform licensed production processes and thereby fabricate the at least one licensed component. The end user of the component, i.e. in particular the actor ACT4, can verify the license of the component part or component individually and thus verify its originality.

Using the method, for example, each change of state in the production machine can be saved as a transaction in a block chain. As a result of using the block chain, in particular with e.g. distributed authentication, it is possible subsequently or at any time, in particular by means of the saved checksums, to verify the authenticity or integrity of the data that is collected or stored by the method, such that said data can be used by e.g. the actors ACT1-ACT4, i.e. the machine fabricator, the product designer, the component manufacturer and the end user of the parts, e.g. for legal matters, and manipulation of a data set by e.g. one of the actors ACT1-ACT4 can be prevented. It is therefore possible particularly advantageously to manage or control and/or check e.g. a warranty protection for a specific number of processed components from the component fabricator ACT3, or the undertaking of an end user of the actor ACT4 to comply with maintenance intervals. In this way, each production step of the production process or a production step that is to be performed at a production site can be included and managed centrally or via the block chain.

In some embodiments, it is also possible for an individual file container CON1-CON3 to be designed as a block chain, such that e.g. the file container CON1 can be used as a block chain specifically in particular for CAD data which allows e.g. in particular the production under license of a specific component in each case. It is then easily possible by means of e.g. combination for this block chain to be merged with the file container CON2 which is designed as a block chain and the file container CON3 which is designed as a block chain to form a so-called super block chain.

Different levels of detail can also be useful in the context of the production process, particularly in relation to the fabrication data DSG. For example, a license that is contained in the reproduction data LIC can be generated for the production of a specific CAD part on a 3D printer, which represents e.g. the production machine. However, only a specific part of the component is approved with a maximum degree of detail in this case, e.g. an interface at the relevant position, wherein the interface is intended e.g. for the installation of a further, different component. Other parts of the component are approved with a lesser degree of detail and can still be unlocked by a licensee if necessary. This structural flexibility can also be used in particular to connect a produced component clearly to a transaction in the block chain. For example, a transaction in the block chain can be clearly connected to a produced component, e.g. by incorporating a code into the reproduction data LIC, which can also be connected or associated with a hardware license of the component via e.g. a hardware token.

The proposed methods simplify many work sequences which occur in connection with the production process. For example, the actor ACT1 as the production designer can offer new component parts and their fabrication processes directly via the block chain or the database, this containing the file container CON1 or also the other file containers CON2-CON3, in particular using the encryption model offered by the key KEY1 or the encryption model of the block chain, for sale to a customer, in particular to a component manufacturer who is the actor ACT3, and authorize the access or the request accordingly using the proposed method.

Furthermore, with regard to maintenance measures for the production machine, the production data PRO can be used to retrieve maintenance personnel maintenance and servicing histories. Moreover, for the purpose of analyzing components, e.g. in the event of an error or for the purpose of optimizing the production, the history of the machine state which is likewise stored in the production data PRO and includes the maintenance measures described above can be retrieved by the product developer or product designer i.e. actor ACT1 so that the process can be improved. The actor ACT2, in particular the production machine fabricator, also directly receives the latest operating information for their production machine. Furthermore, in particular during the production process and during the individual production steps, respective data from the respective production step can therefore be recorded very easily by the method and therefore managed, in particular actively.

LIST OF REFERENCE SIGNS

ACT1 First actor
ACT2 Second actor
ACT3 Third actor
ACT4 Fourth actor
CON1 First file container
CON2 Second file container
CON3 Third file container
DAT1 First data
DAT2 Second data
DAT3 Third data
DAT4 Fourth data
DSG Fabrication data
ECU Computing unit
INT Interface
KEY1 First key
KEY2 Second key
KEY3 Third key
LIC Reproduction data
OBJ Character data
PRO Production data
PRT Part of the data
REQ Request
STP1 First step
STP2 Second step
STP3 Third step
STP4 Fourth step
STP5 Fifth step
STP6 Sixth step

What is claimed is:

1. A method for managing a production process for fabricating a component, the method comprising:
storing fabrication data for fabricating the component in a first file container;
storing reproduction data relating to the component in the first file container, wherein said reproduction data includes a permission relating to the fabrication of the component;
storing production data associated with a production machine during the production process in a second file container, wherein the production data relates to a deployment or utilization of the production machine, problems arising with the production machine, and/or maintenance measures undertaken with regard to the production machine;
storing character data indicating a property of the component in a third file container;
receiving a request; and
providing an encrypted response to the request, the encrypted response including at least one datum selected from the group of data consisting of: the stored fabrication data, the reproduction data, the production data, and/or the character data;
wherein the fabrication data is encrypted using a first key, the production data is encrypted using a second key, and the character data is encrypted using a third key; and
wherein the first key, the second key, and the third key are each a separate key generated by an asymmetric cryptography method.

2. The method as claimed in claim 1, further comprising verifying whether the request is authorized to effect the provision of the at least one datum.

3. The method as claimed in claim 1, wherein the first file container and the second file container, or the second file container and the third file container, or the third file container and the first file container, or the first file container and the second file container and the third file container comprise a shared file container.

4. The method as claimed in claim 1, further comprising storing a checksum of the fabrication data or the production data or the character data in the respectively associated file container.

5. The method as claimed in claim 1, further comprising storing a checksum of the fabrication data or the production data or the character data in a separate further file container.

6. The method as claimed in claim 1, wherein each of the file containers is stored in a respective database.

7. The method as claimed in claim 6, wherein at least one of the databases comprises a distributed ledger.

8. The method as claimed in claim 1, wherein the fabrication data is assigned level of detail characterizing an accuracy with which the fabrication data must be provided.

9. The method as claimed in claim 8, characterized in that the fabrication data is provided on the basis of the level of detail as a function of the request.

10. The method as claimed in claim 1, wherein the production data comprises configuration data and/or maintenance measures and/or production processes that have been performed and/or warning/error reports relating to the production machine.

11. The method as claimed in claim 1, wherein the production data comprises a time and/or a duration of at least one production step of the production process.

12. The method as claimed in claim 1, wherein the character data comprises a production step of the production process and/or fabricator details and/or a date of the production step and/or a location of the production step.

13. The method as claimed in claim 1, further comprising assigning to the component a hardware token which can be identified with reference to the reproduction data.

14. The method as claimed in claim 1, wherein at least a part of the component is manufactured using additive and/or subtractive manufacturing.

15. A non-transitory memory storing a program which can be loaded into a memory of an electronic computing unit, the program comprising instructions which, when executed, cause the electronic computing unit to:
store fabrication data for fabricating the component in a first file container;
store reproduction data relating to the component in the first file container, wherein said reproduction data includes a permission relating to the fabrication of the component;
store production data associated with a production machine during the production process in a second file container, wherein the production data relates to a deployment or utilization of the production machine, problems arising with the production machine, and/or maintenance measures undertaken with regard to the production machine;
store character data indicating a property of the component in a third file container;
receive a request; and provide an encrypted response to the request, the encrypted response including at least one datum selected from the group of data consisting of: the stored fabrication data, the reproduction data, the production data, and/or the character data;

wherein the fabrication data is encrypted using a first key, the production data in encrypted using a second key, and the character data is encrypted using a third key; and wherein the first key, the second key, and the third key are each a separate key generated by an asymmetric cryptography method.

\* \* \* \* \*